(12) United States Patent
Ishii et al.

(10) Patent No.: US 11,598,971 B2
(45) Date of Patent: Mar. 7, 2023

(54) IMAGE DEVICE WITH A COMPACT HOMOGENIZER

(71) Applicants:Fusao Ishii, Pittsburgh, PA (US); NTT DOCOMO, INC., Tokyo (JP)

(72) Inventors: Fusao Ishii, Pittsburgh, PA (US); Mikiko Nakanishi, Tokyo (JP); Kazuoki Ichikawa, Tokyo (JP); Yuji Aburakawa, Tokyo (JP)

(73) Assignees: Fusao Ishii, Pittsburgh, PA (US); NTT DOCOMO, INC., Tokyo (JP)

( * ) Notice: Subject to any disclaimer, the term of this patent is extended or adjusted under 35 U.S.C. 154(b) by 100 days.

(21) Appl. No.: 16/798,951

(22) Filed: Feb. 24, 2020

(65) Prior Publication Data

US 2020/0192111 A1    Jun. 18, 2020

Related U.S. Application Data

(60) Provisional application No. 62/809,457, filed on Feb. 22, 2019.

(51) Int. Cl.
*G02B 27/28* (2006.01)
*G02B 27/01* (2006.01)

(52) U.S. Cl.
CPC ....... *G02B 27/283* (2013.01); *G02B 27/0172* (2013.01); *G02B 2027/011* (2013.01); *G02B 2027/0118* (2013.01)

(58) Field of Classification Search
CPC .. G02B 27/283; G02B 5/3083; G02B 27/286; G02B 5/3058; G02B 6/0056; G02B 5/3066; G02B 27/28; G02B 5/3025; G02B 19/0028; G02B 1/04; G02B 27/145; G02B 27/285; G02B 5/0278; G02B 5/045; G02B 5/305; G02B 5/0242; G02B 5/3041; G02B 6/0053; G02B 19/0061; G02B 27/0994; G02B 30/25; G02B 5/3016; G02B 5/3033; G02B 6/0038; G02B 6/0051; G02B 6/0065; G02B 19/0019; G02B 19/0047; G02B 19/0057; G02B 19/0066; G02B 1/08; G02B 2027/0178; G02B 27/0025; G02B 27/0172; G02B 27/102; G02B 27/149; G02B 27/281; G02B 27/288; G02B 3/005; G02B 3/0056; G02B 5/0231; G02B 5/0284; G02B 5/08; G02B 5/30; G02B 5/3008; G02B 6/00; G02B 6/0096; G02B 6/272; G02B 19/0023; G02B 19/0033; G02B 19/0076; G02B 19/009; G02B 19/0095; G02B 1/005; G02B 1/02; G02B 1/111; G02B 2027/011; G02B 2027/0116; G02B 2027/0123; G02B 2027/0125; G02B 2027/0132; G02B 2027/0134; G02B 2027/015; G02B 23/02;

(Continued)

(56) References Cited

U.S. PATENT DOCUMENTS

| | | | |
|---|---|---|---|
| 10,579,140 B2* | 3/2020 | Border | G06K 9/222 |
| 2016/0021304 A1* | 1/2016 | Osterhout | G06K 9/00771 348/77 |
| 2019/0086674 A1* | 3/2019 | Sinay | G06T 19/006 |

FOREIGN PATENT DOCUMENTS

KR        20120007015 U  * 10/2012  ............. G02B 5/30

* cited by examiner

*Primary Examiner* — Collin X Beatty
*Assistant Examiner* — Grant A Gagnon
(74) *Attorney, Agent, or Firm* — Bo-in Lin

(57) ABSTRACT

A compact light source for a projection display is disclosed enabling eye-glass display using a Fresnel mirror reflecting light without a distance as conventional prism type reflector.

10 Claims, 9 Drawing Sheets

(58) Field of Classification Search
CPC ...... G02B 26/004; G02B 26/04; G02B 26/06; G02B 26/101; G02B 27/0006; G02B 27/0081; G02B 27/0101; G02B 27/0176; G02B 27/09; G02B 27/0911; G02B 27/0927; G02B 27/0966; G02B 27/0977; G02B 27/10; G02B 27/1006; G02B 27/1026; G02B 27/104; G02B 27/1046; G02B 27/106; G02B 27/141; G02B 27/143; G02B 27/144; G02B 27/147; G02B 27/30; G02B 27/48; G02B 30/00; G02B 30/27; G02B 30/34; G02B 30/35; G02B 30/40; G02B 30/52; G02B 3/0062; G02B 3/0068; G02B 5/001; G02B 5/008; G02B 5/02; G02B 5/021; G02B 5/0215; G02B 5/0221; G02B 5/0236; G02B 5/0247; G02B 5/0252; G02B 5/0268; G02B 5/0289; G02B 5/0294; G02B 5/04; G02B 5/0833; G02B 5/0891; G02B 5/122; G02B 5/124; G02B 5/1809; G02B 5/26; G02B 5/285; G02B 5/286; G02B 5/32; G02B 6/0008; G02B 6/0018; G02B 6/003; G02B 6/0035; G02B 6/0036; G02B 6/0041; G02B 6/0046; G02B 6/0055; G02B 6/0068; G02B 6/024; G02B 6/126; G02B 6/2706; G02B 6/2766; G02B 6/2773; G02B 6/278; G02B 6/2786; G02B 6/34; G02B 6/4246; G02B 6/4298; G02B 7/1805; G02F 1/133536; G02F 1/13362; G02F 1/133607; G02F 1/133606; G02F 1/0136; G02F 1/133545; G02F 1/133638; G02F 1/133504; G02F 1/133528; G02F 1/133543; G02F 1/133604; G02F 1/133611; G02F 1/133634; G02F 1/0139; G02F 1/0147; G02F 1/09; G02F 1/11; G02F 1/1334; G02F 1/133507; G02F 1/133514; G02F 1/133541; G02F 1/133548; G02F 1/13355; G02F 1/133605; G02F 1/133615; G02F 1/13363; G02F 1/133631; G02F 1/13725; G02F 1/33; G02F 1/3513; G02F 1/365; G02F 2201/16; G02F 2201/17; G02F 2201/346; G02F 2201/38; G02F 2201/50; G02F 2202/046; G02F 2202/28; G02F 2202/30; G02F 2202/40; G02F 2203/06; G02F 2203/07
USPC .......................................................... 359/487
See application file for complete search history.

IMAGE DEVICE WITH A COMPACT HOMOGENIZER

CROSS REFERENCE TO RELATED APPLICATIONS

This application is a Non-Provisional application and claim the Priority Date of a previously filed Provisional Application 62/809,457 filed on Feb. 22, 2019, and this application is a Continuation in Part application of Ser. No. 16/252,267 filed on Jan. 19, 2019. Application Ser. No. 16/252,627 is a Continuation in Part (CIP) application of Patent Application PCT/US17/38523 filed on Jun. 21, 2017 which is a Non-Provisional filing of a Provisional Application 62/493,077 filed on Jun. 21, 2016.

TECHNICAL FIELD

The present invention relates to an image device having an illumination system of a wearable display system for projecting an image. More particularly, the present invention relates to an image device having a very compact illuminator suitable for a wearable display having a very small form factor.

BACKGROUND ART

Wearable displays provide the benefits of hands free operation as well as showing the images to the person who wears the display at a distance same as regular sight. However, the conventional near eye displays such as Head Mount Display, Head up Display and Eye Glass Type Display have not provided satisfied wearable display solutions to the viewers, because these conventional devices are often too heavy, too large, and too dark. Therefore, there are urgent needs for providing wearable display devices that are light, small, bright, having high resolution with see-through viewing optical path.

It is further desirable that the new wearable devices can be produced at a reasonable lower cost and can display large image. It is further desirable that a person can wear such devices can in a stealthy manner without being ostensibly detected by others that the person is wearing such a wearable device. Display systems implemented with LED and Laser light sources usually have a technical problem with uneven distribution of light intensity and a homogenizer is typically required for the display systems to provide uniform brightness of image. Three separate color light sources require to combine into a single light beam before projecting onto a display device. Enabling a compact eye-glass type display requires a very small system having both homogenizer and combiner. Several systems are proposed in the past.

As shown in FIG. 1, Takeda et al. disclosed in U.S. Pat. No. 8,711,487 an eye glass type display system that implements see-through capability with a wave guide and a half-mirror. This system incorporates a transmissive LCD as a display and the illumination system is a backlight light-guide that diffuses the light from the light source. This system is suitable for transmissive LCD, but not necessarily suitable for other display devices such as LCOS and DMD.

As shown in FIG. 2 and FIG. 2A, Takahashi et al. disclosed in US Patent Application Publication US2013/0021581 an illuminator and a display for miniaturization. The system comprises multi-color light sources such as LED and Laser (11) with micro-lenses (116) to collimate, dichroic mirrors (117) to combine light beams as shown in FIG. 2 A and a polarized beam splitter (PBS, 16) arranged in perpendicular direction from LCOS (17). If this is used for an eye-glass display and embedded in a temple of glasses, this illuminator will stick out of the temple of glasses. In FIG. 2, Light beams from LEDs (11B, 11G, 11R) are condensed by a condenser lens (14) and a micro-lens array (15) and lead to a PBS (16, Polarize Beam Splitter) then focused by a lens set (18a, 18b, 18c) through a cover glass (30). In FIG. 2A, Light sources (11R, 11G, 11B) emit light beams (Lr, Lg, Lb) and the beams are collimated by collimation lenses (116a, 116b, 116c, 116) held by frames (116s) and the collimated beams are reflected by a mirror (117c) and dichroic mirrors (117a, 117b) through a filter (118).

As shown in FIG. 3, Katsumata et al. disclosed in JP2013-195603 a Planar Lightwave Circuit (PLC). A beam from a laser diode is lead into a light-wave guide and the light energy in a light-wave can be transferred to an adjacent light-wave guide in a certain condition. This method is suitable for a combiner of laser light sources and has a great potential, although it requires further study prior to high volume. FIG. 3 is disclosed by Katsumata et al. Disclosed in JP 2013-195603, a Planar Lightwave Circuit (10, 220, PLC). A beam from a laser diode is lead into a light-wave guide and the light energy in a light-wave. This is another way to combine multiple light beams into one. Laser beams are inputted at openings (101a, 102a, 103a) of optical fibers (101, 102, 103). Light beams are integrated at integrators (110, 120, 130 and a phase controller (140).

SUMMARY OF THE INVENTION

This image type is an ultra-compact flat homogenizer and diffuser. This type is based on Fresnel lens wave guide, display device and a cubic PBS. This type of compact display is suitable for a wearable display.

DETAIL DESCRIPTIONS OF PREFERRED EMBODIMENTS

Figure 1:
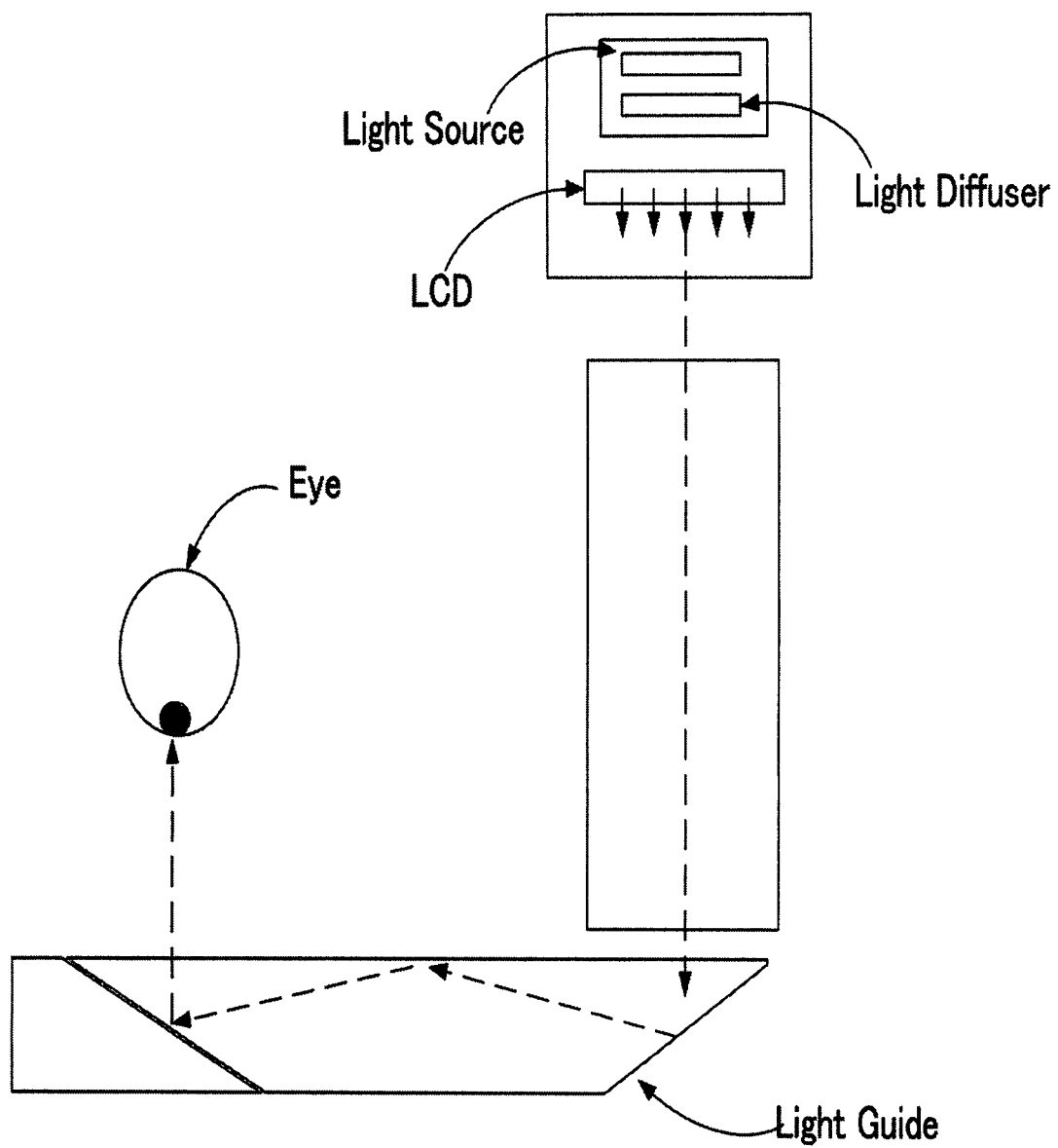
FIG. 1 is a structure of see-through display shown by Takeda et al. Disclosed in U.S. Pat. No. 8,711,487. As an illuminator for a LCD display panel, a backlight module was used.
Figure 2:
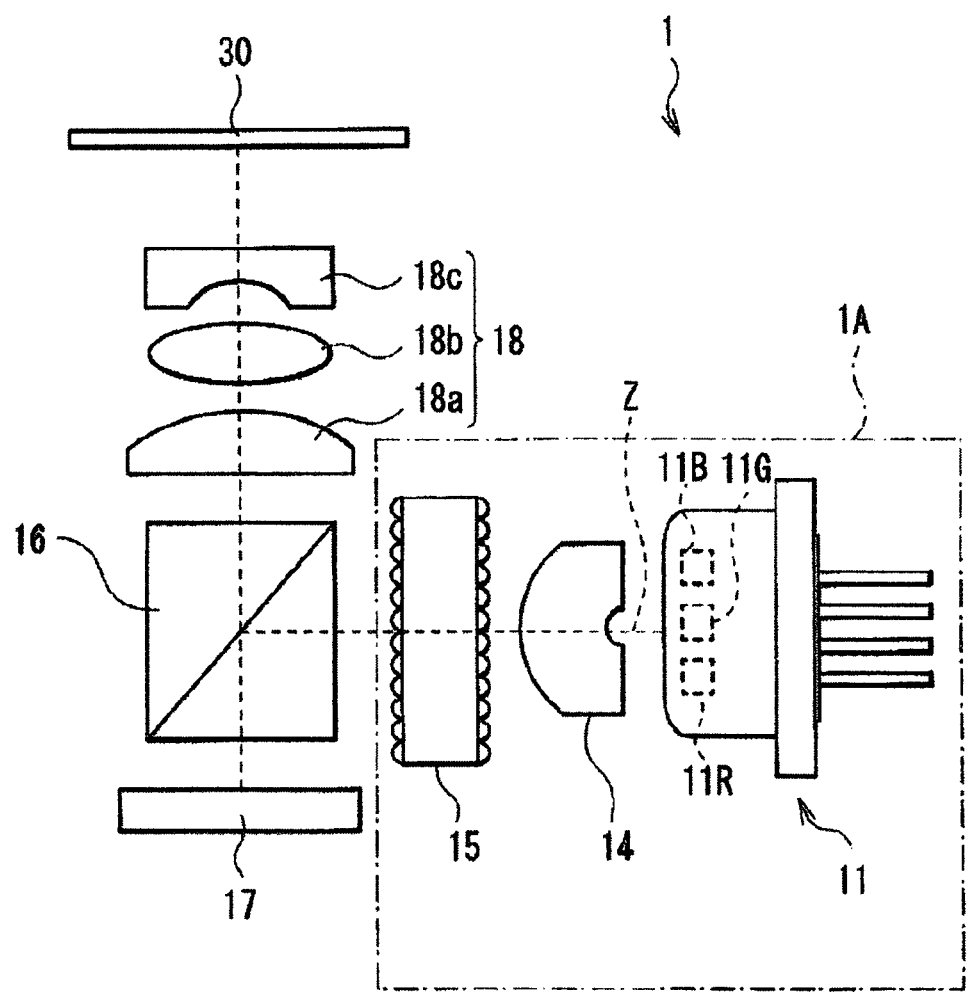
FIG. 2 and FIG. 2A are shown by Takahashi et al. In US Patent Application Publication US 2013/0021581, referred to as an expander lens and a micro-lens are used to provide light to a PBS.
Figure 2A:
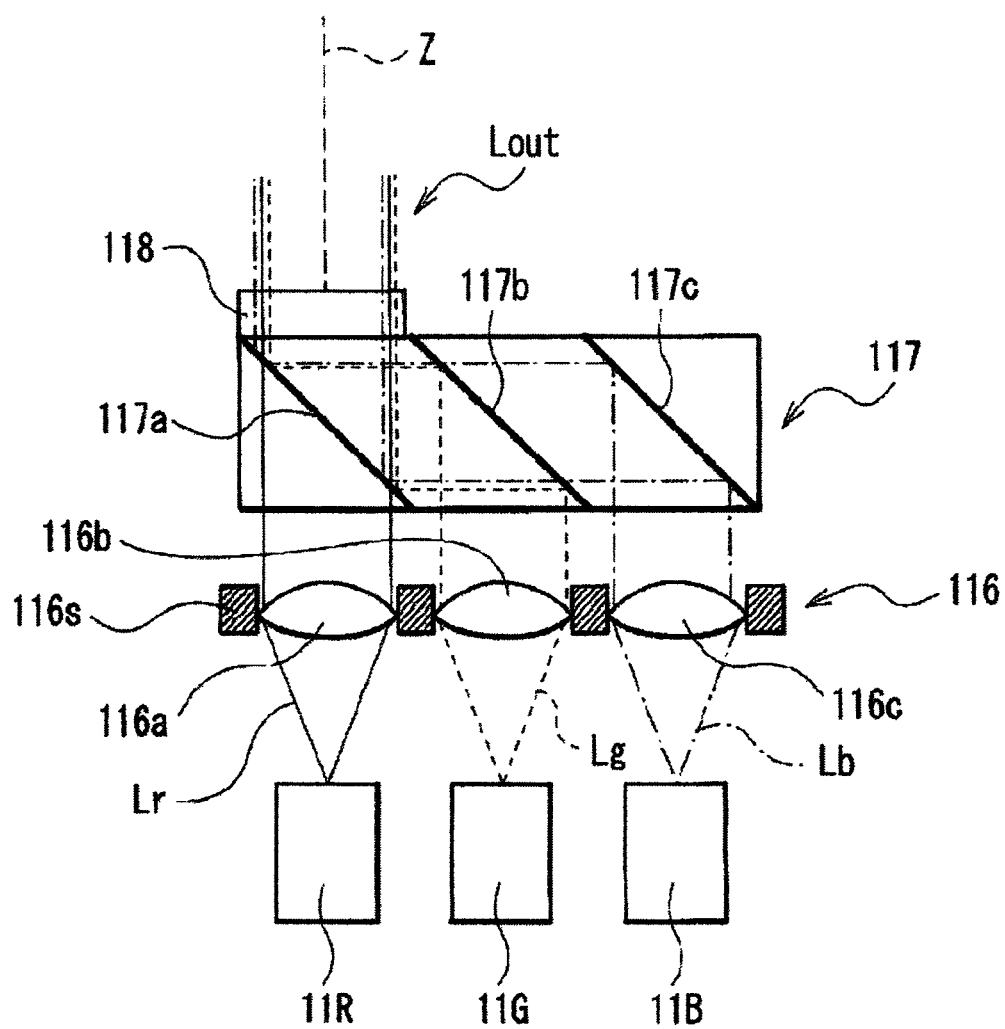
Figure 3:
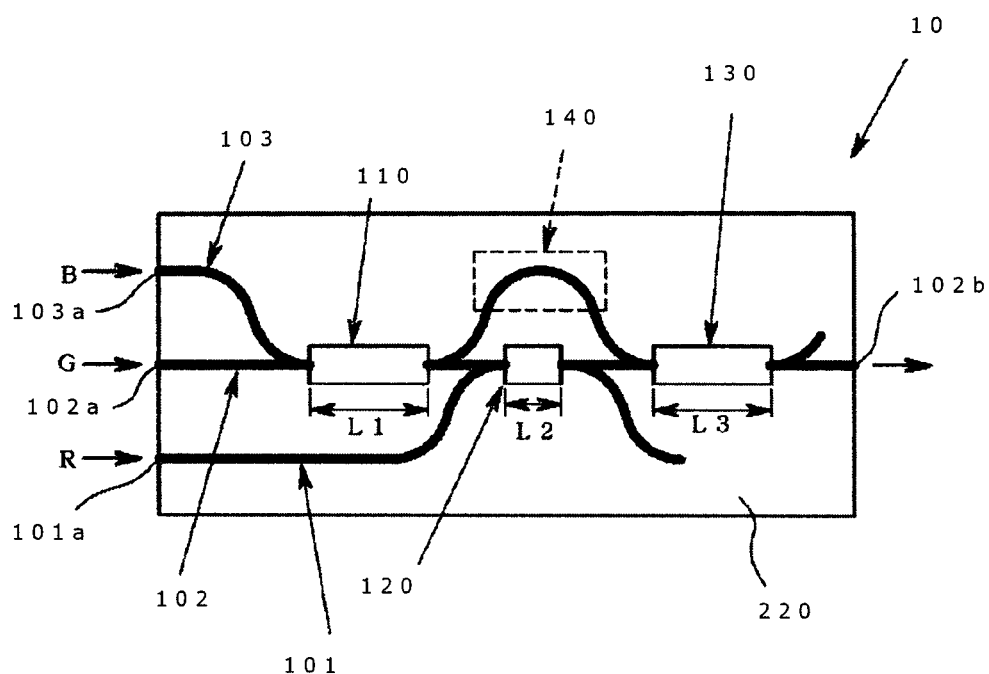
FIG. 3 is disclosed by Katsumata et al. Disclosed in JP 2013-195603, a Planar Lightwave Circuit (PLC). A beam from a laser diode is lead into a light-wave guide and the light energy in a light-wave. This is another way to combine multiple light beams into one.
Figure 4:
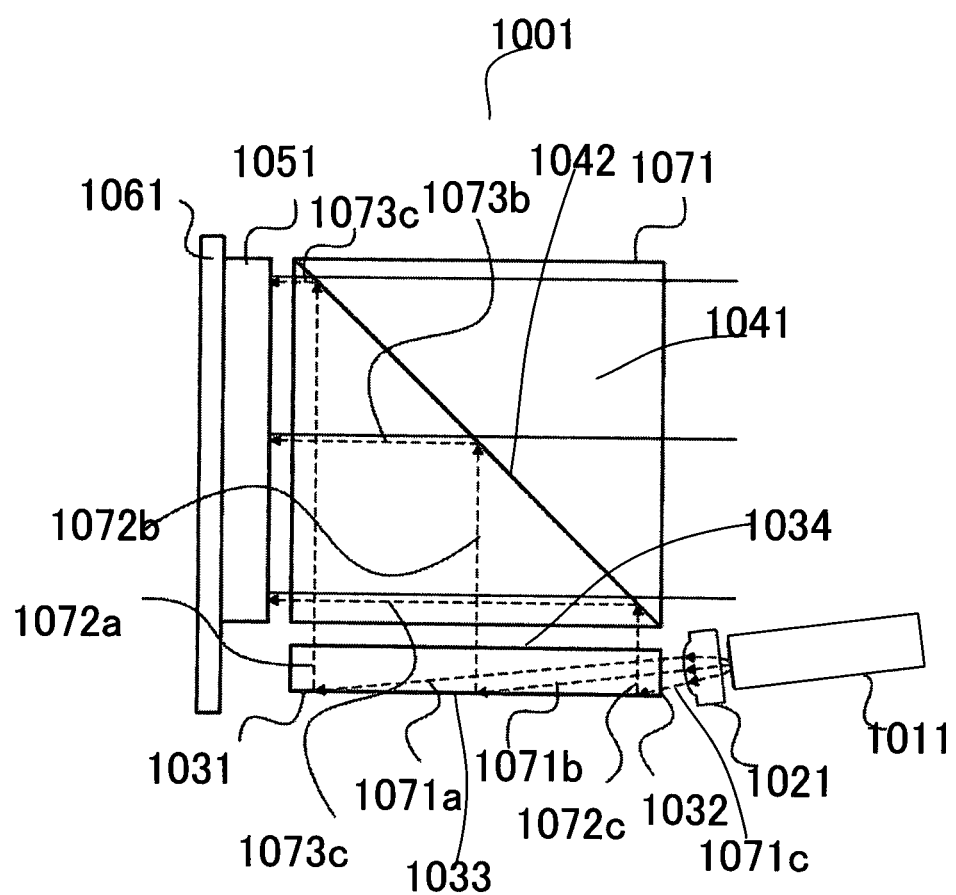
FIG. 4 is a cross-sectional diagram of an image device 1001 according to a preferred embodiment.
Figure 5:
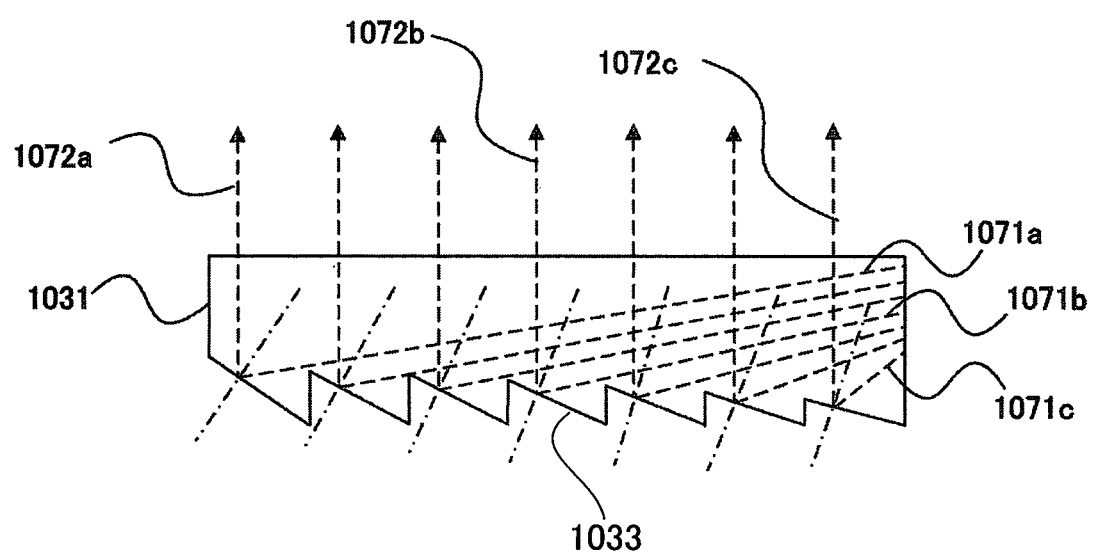
FIG. 5 shows a detailed cross-sectional view of the transparent waveguide 1031 according to a preferred embodiment.

FIG. 4 is a cross-sectional diagram of an image device 1001 according to a preferred embodiment 1. The image device 1001 is incorporated in a head mounted display or an eyeglass type display to form an image as that shown in FIG. 6 below. FIG. 5 shows a detailed cross section of the transparent waveguide 1031 according to a preferred embodiment.

The image device 1001 is composed of a light source 1011, a Lens 1021, a transparent waveguide 1031, a Polarized Beam Splitter (PBS) 1041 and display device 1051.

The light source 1011 is also the light source with light source 1011 consist of three-color RGB LED. The visible lights are RGB light. Also, the light source 1011 may be irradiates continuous color spectrums lights.

The waveguide 1031 has a function as a homogenizer and diffuser. In the waveguide 1031, the visible light irradiated by the light source 1011 is incident from the edge 1032 of the wave guide through the lens 1021. The waveguide 1031 has Fresnel lens surfaces 1033. The visible light incident from the edge 1071c is reflected by Fresnel lens surfaces 1033 (Saw shape). Light 1071a reflects to Light 1072a a. Light 1071 b is reflected to Light 1072 b. Light 1071 c reflects to Light 1072 c. The light axes centers of the lights 1071 a, 1071 b, and 1071 c are not parallel to each other. However, due to the reflection at the Fresnel lens surfaces 1033, the light axes centers of the lights 1072a, 1072b, and 1072c are parallel to each other. Light 1072a, 1072b, 1072c exit waveguide surface 1034.

The PBS 1041 is a cube-like structure having an internal polarizing plate surface 1042. Light 1072a, 1072b, 1072c are reflected by the internal polarizing plate surface 1042 and reach the display device 1051 as lights 1073a, 1073b, 1073c.

The display device 1051 is an image generating device composed of liquid crystal on silicon (LCOS). The display device 1051 is installed on the circuit board 1061. Light 1073a, 1073b, 1073c are irradiated to the LCOS. The LCOS is controlled to form an image on the circuit board 1061. Then, it reflects the light 1074a, 1074b, 1075c corresponding to the image. Light 1074a, 1074b, 1075c is incident on the PBS 1041, passes through the internal polarizing plate surface 1042, and exits the PBS 1041. The lights 1074a, 1074b, and 1075c form images on human eyes through other optical systems constituting the head mounted display. The display device 1051 may be a liquid crystal display (LCD) or a micromirror device.

Figure 6:
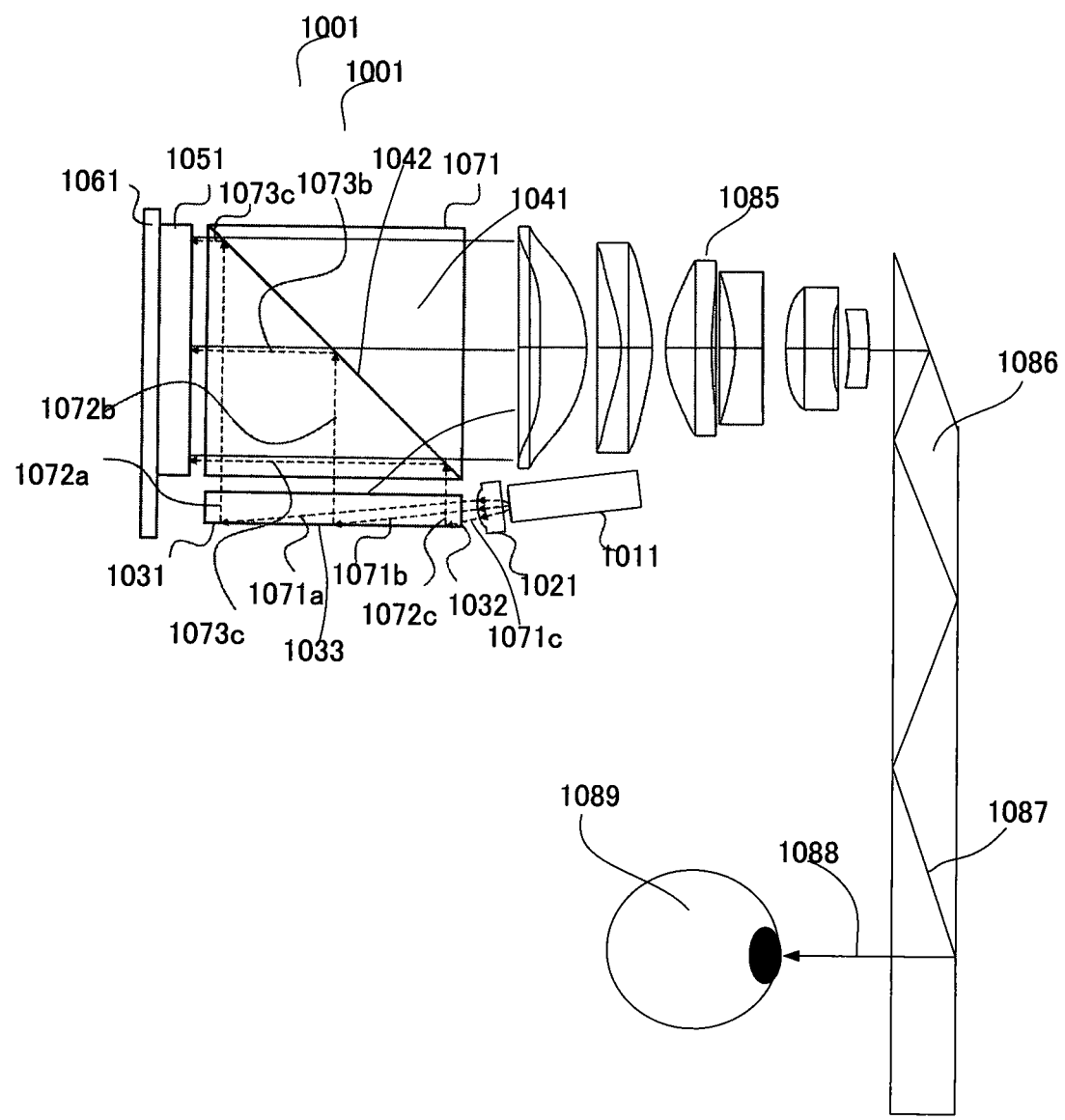
FIG. 6 shows an example of eye-glass display using this invention.

FIG. 6 shows an example of this invention, A light source (1084) emits light through a lens (1083) to this invention's homogenizer (1077) which outputs light in uniform distribution toward the PBS (1071). The PBS reflects the incoming light to a display device (1074) and the display device reflects light through the PBS to a lens set (1085) to project an image to a waveguide (1086) and the light propagates inside the waveguide with total-internal-reflection (TIR) and reflected to a viewer's eye (1089).

With the above configuration, it is possible to irradiate parallel and homogeneous light to the PBS by a very flat waveguide working as a flat homogenizer. Therefore, it is possible to provide a wearable display device that is bright, small, bright, and high resolution using a transparent optical path.

FIG. 5 shows an example of embodiment of homogenizer using Fresnel mirror at one side of homogenizer (1031), wherein the light beams from a light source is directly reflected to the next target without TIR.

Figure 7:
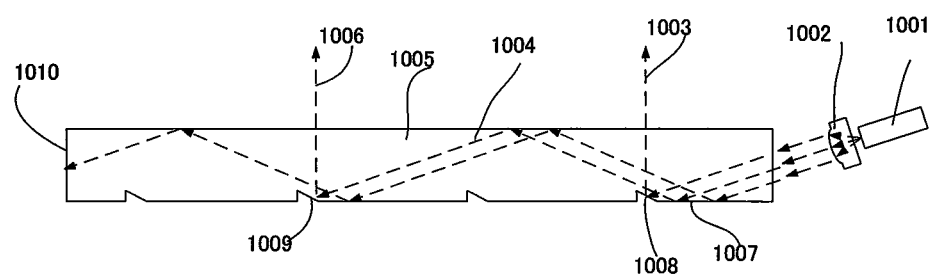
FIG. 7 shows another example of this invention. The light emitted from the light source 1001 propagates inside the homogenizer 1005 and is reflected by total-internal-reflection (TIR) by both top and bottom surfaces and reflected by the surfaces of Fresnel mirror (1008) to outside.

FIG. 7 shows an example of embodiment of this invention of homogenizer wherein the incoming light is reflected by TIR internally and reflected to outside.

Figure 8:
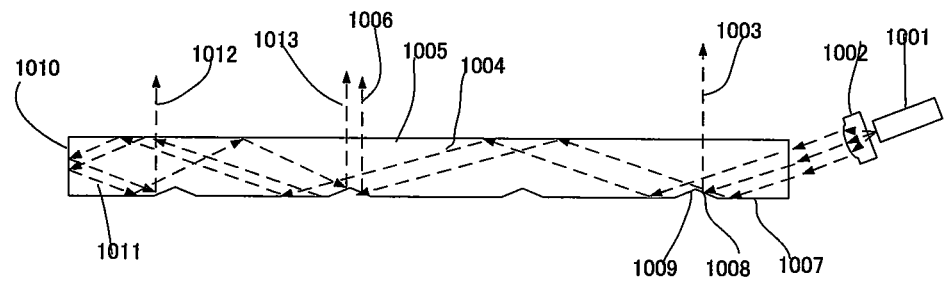
FIG. 8 shows another example of this invention. The light emitted from the light source (1001) propagates inside the homogenizer (1005) and reflected by TIR. The other edge-surface (1010) reflects back the internal light to increase the output with the surfaces in two direction of Fresnel mirror.

FIG. 8 shows another example of embodiment wherein the incoming light is reflected by top and bottom surfaces and also reflected by side edge surfaces with double direction Fresnel mirror.

Figure 9:
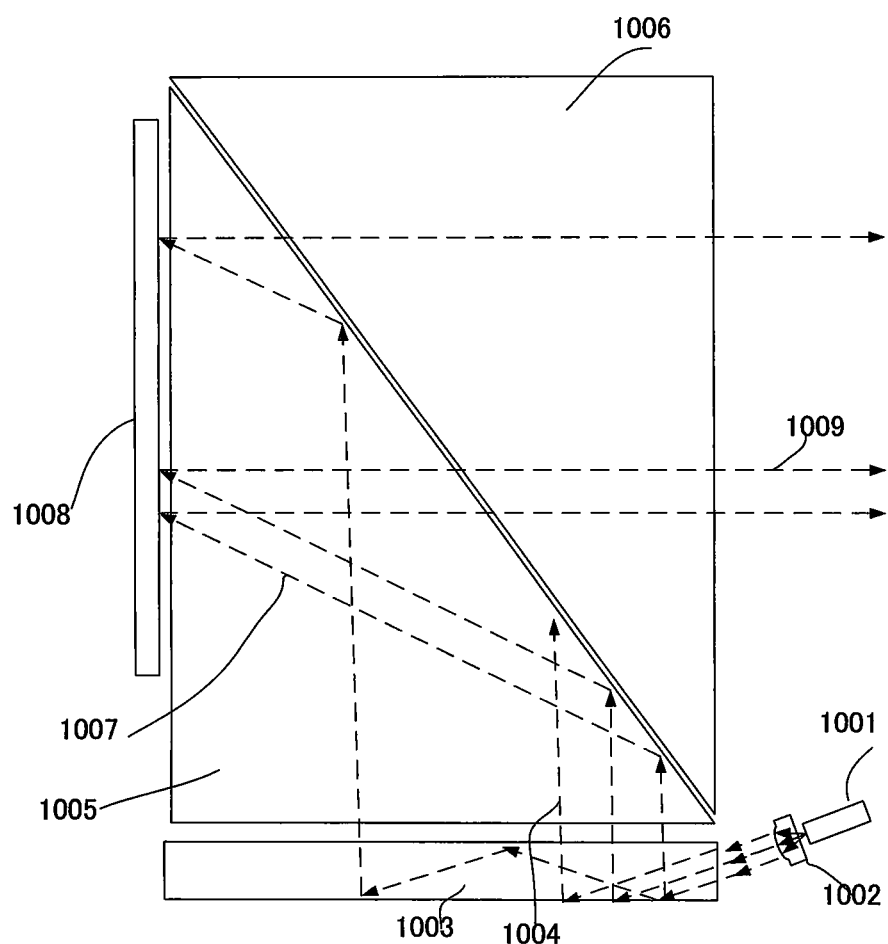
FIG. 9 shows another example of this invention. The light emitted by the light source (1001) is reflected by the homogenizer (1003) toward a set of prism (1005 and 1006), often referred as TIR prism. The reflected by TIR prism is lead to a display device (1008) and reflected through the TIR prism.

FIG. 9 is an example of this invention wherein the outputted light from a homogenizer is lead to a set of prisms (TIR prism) and reflected by a display device toward a set of projection lens.

What is claimed is:

1. An image device comprising
    a light source irradiating lights of a plurality of visible wavelengths for projecting to a transparent waveguide wherein the transparent waveguide having a saw-tooth shaped Fresnel lens surface disposed on the bottom surface of the waveguide for reflecting the lights as multiple light beams with a parallel optical axis along a vertically upward direction into a Polarized Beam Splitter (PBS) disposed immediately above the waveguide along the vertically upward direction; and
    the PBS constituting a cube-like structure having a diagonally oriented internal flat polarizing plate for changing polarizations and reflecting the light beams projected from the waveguide toward a display device having an image generating apparatus to display an image.

2. The image device according to claim 1, wherein the display device having the image generating apparatus further comprises an apparatus formed as a LCOS, LCD or Micromirror Device.

3. The image device according to claim 1, wherein the lights projected from the light source are projected and reflected by the flat surfaces of waveguide through total-internal-reflection.

4. The image device according to claim 1, the light source further comprises a three-color RGB LED light source.

5. The image device according to claim 1, the light source further comprises a light source irradiates continuous color spectrums lights.

6. An image device comprising
    a light source irradiating lights of a plurality of visible wavelengths for projecting to a transparent waveguide wherein the transparent waveguide having a saw-tooth shaped Fresnel lens surface disposed on the bottom surface of the waveguide for reflecting the lights as multiple light beams with a parallel optical axis along a vertically upward direction into a Polarized Beam Splitter (PBS) disposed immediately above the transparent waveguide along the vertically upward direction; and
    the PBS constituting a cube-like structure having a diagonally oriented internal flat polarizing plate for changing polarizations and reflecting the light beams with the parallel optical axis projected from the waveguide toward a display device for generating an image and the display device further reflects the image through the PBS and a lens set toward a total-internal-reflection (TIR) waveguide for propagating the image through and inside the total-internal-reflection (TIR) waveguide with a total internal reflection for reflecting the image to a viewer's eye.

7. The image device according to claim 6, wherein the display device further comprises a Micromirror Device.

8. The image device according to claim 6, wherein:
the lights projected from the light source are projected directly and reflected by the Fresnel mirror toward the display device.

9. The image device according to claim 6, wherein, the light source further comprises a three-color RGB LED light source.

10. The image device according to claim 6, the light source further comprises a light source irradiates continuous color spectrums lights.

\* \* \* \* \*